Patented June 5, 1934

1,961,738

UNITED STATES PATENT OFFICE 1,961,738

MANUFACTURE OF ACETIC ACID

Joseph C. Carlin, Nashville, Tenn., and Norman W. Krase, Urbana, Ill., assignors to Tennessee Products Corporation, Nashville, Tenn., a corporation of Tennessee No Drawing. Application August 18, 1932, Serial No. 629,304

32 Claims. (Cl. 260—116)

This invention relates to the manufacture of acetic acid.

One object of the invention is to provide a simple and efficient method of manufacturing acetic acid economically.

A further object is to provide a method of manufacturing acetic acid by utilizing methanol and forming therewith, a reaction mixture containing carbon monoxide, which reaction mixture is pre-treated or conditioned and then subjected to the action of a catalyst, all under suitable conditions of heats, pressures and speeds of reactance, and finally separating and recovering the useful products of the reactions.

Other and subsidiary objects and purposes of the invention will appear more fully hereinafter.

The invention consists substantially in the steps and mode of procedure all as will be more fully hereinafter set forth, and finally pointed out in the appended claims.

It is known that acetic acid can be produced by subjecting mixtures of carbon monoxide and methyl alcohol to the action of heat and pressure in the presence of a catalyst, the resulting reaction causing the formation of acetates from which acetic acid may be obtained. It is also known to replace the methyl alcohol, wholly or in part, by methyl ether or other compound containing separable methoxy groups. It has also been proposed to generate or produce the methyl alcohol required either wholly or in part, simultaneously or along with the catalytic reaction referred to. In such case, instead of employing methyl alcohol as such and introducing the same along with carbon monoxide into the reaction chamber, substances or mixtures of substances capable of decomposing, combining, or reacting to form methyl alcohol may be employed, such, for example as a methyl ester, more specifically methyl formate which is capable of yielding both methyl alcohol and carbon monoxide or methyl acetate. It has also been suggested that the carbon monoxide constituent of the reaction mixture may be supplied either as such, or in mixtures with hydrogen, or other inert gases. Water gas, producer gas, or coke oven gas have been mentioned as suitable for use where a carbon monoxide mixture with hydrogen is to be employed.

These various proposals for the production of acetic acid, however, notwithstanding their promise of success, have not worked out with entirely satisfactory results in practical commercial operation. Various causes have contributed to the unsatisfactory results realized. Among these may be mentioned failure to attain economy of operation. Yields of acetic acid in sufficient relative volume have not been realized. The rapid depletion of the effective action of the catalyst employed, thereby necessitating frequent renewals thereof, often necessitating the interruption of the continuity of the process, the temporary shutting down of the plant while the catalyst is being replaced or renewed, and the consequent loss of time and curtailment of production. Many of the prior suggestions above noted result in imposing increased duties on the catalyst, as for instance where the methyl alcohol constituent of the reaction mixture is replaced by a substance or mixture capable of decomposing in the reaction chamber, in the presence of the catalyst, to form methyl alcohol; and also where the carbon monoxide for the reaction mixture is formed in the reaction chamber. In all such cases the life, as well as the effective action of the catalyst is rapidly depleted, thereby necessitating frequent renewal of the catalyst with all the incidental losses above noted. Again, in some cases, excessive volumes of carbon monoxide or of methyl alcohol, or of other substitutes for these substances, are required in the reaction mixture which not only adds greatly to the costs of the process, but also results in the formation of undesirable decomposition products, thereby increasing the cost and decreasing the yield and quality of the desired end product of acetic acid.

It is among the special purposes and aims of the present invention to avoid these and many other objections to the processes heretofore proposed, and to provide a simple, economical and commercially practical process for producing acetic acid.

In carrying out our new process we have been able to greatly extend the life and effectiveness of the catalyst employed; to avoid the necessity for imposing extra duty on the catalyst; to avoid the necessity of employing excessive amounts or volumes of starting or raw materials comprising the reaction mixture; to avoid the formation of undesired and undesirable decomposition products; and to greatly increase the yield of acetic acid, thereby attaining a higher degree of economy and securing a larger volume and a more satisfactory quality of the end product than has heretofore been possible.

In general our present process contemplates the employment of a reaction mixture consisting of methanol, water, if desired, and carbon monoxide. This mixture is subjected to a pre-treating or conditioning action over a suitable agent capable of rendering the reaction mixture more easily and readily susceptible to the catalytic actions, and of increasing the rate of reaction, thereby increasing the yield and quality of acetic acid. We also propose, in some cases, to employ carbon dioxide and/or hydrogen in the reaction mixture for the purpose of preventing the formation of undesired decomposition products which might interfere if formed, not only with a proper reaction of the carbon monoxide and methanol mixture to form acetic acid, thereby decreasing the yield of acetic acid, but also to prevent the decomposition of acetic acid, when formed and the deposition of carbon.

We also propose, in accordance with our invention, to minimize and/or suppress the formation of deleterious and undesired decomposition products, by observing and maintaining desirable space velocity not only in the pretreating but also in the reaction operations thereby also increasing the yield of acetic acid. We also propose to carry out the operation, at the various stages thereof, under suitable conditions of temperature and pressure to enable the desired speed of reaction to be realized and to secure the maximum recovery of acetic acid. We also propose to condense the gases and vapors coming from the reaction chamber, at successively reduced temperatures in order to trap out separate and recover the acetic acid and other condensates, and to recirculate any uncondensed or residual vapors and gases and to return into the system any desired recovered condensate, for further reaction treatment.

By observing these and other details of procedure, to be hereinafter set forth more specifically, we have found it possible to greatly increase the yield of acetic acid, more rapidly and more economically than has been possible heretofore. We have also found that a better grade of commercial acetic acid is produced; that we are enabled to use commercial diluted methanol in place of a purer product heretofore believed to be necessary; that we are enabled to avoid or minimize the formation of undesirable decomposition products which heretofore has greatly interfered with and impeded the process of producing acetic acid; and that we are enabled to produce commercial grades of acetic acid at a greatly reduced cost.

We also have found in actual practice that we have been able to obtain a greater amount of acetic acid per unit of catalyst employed, a longer life for the catalyst, and a higher concentration of acetic acid in the condensates, than has been possible heretofore. Moreover, we are enabled to secure a larger direct yield of acetic acid thereby avoiding to a great extent the necessity of further operations or reworking to convert condensates into acetic acid, as, for example, the conversion of a salt into acetic acid.

Again, since acetic acid, by reason of its extensive use, as a chemical agent in industrial operations, may be properly regarded as being in and of itself essentially a raw material. Economic efficiency requires that the manufacture of this raw material take place in the near vicinity of the place of its consumption. This important practical requirement demands that the process of producing the agent be capable of a high degree of flexibility of location of the producing plant. For the same reason the acetic acid production should be of such a nature as to readily lend itself to economic operation at locations where the base materials composing the required reaction mixture are readily, easily and economically obtainable. Since, according to our process, these base materials are such as to be easily and readily obtainable at or near the location of any consumption plant, we are enabled to secure a very high degree of flexibility of location of the producing plant.

More specifically describing our present process, we propose to employ methanol and carbon monoxide as the principal ingredients of the reaction mixture. We have found that the ordinary commercial methanol is suitable for our purposes.

Instead of using methanol alone, we have found that the yield of acetic acid is increased by employing a mixture of methanol and water. In such case a mixture of 80% by volume of methanol and 20% by volume of water, well answers our purpose; it being understood, of course, that our invention is not to be restricted to these specific proportions.

The methanol vapor, or the mixture of methanol and water vapors, where water is employed, is mixed with carbon monoxide gas. We have found that the best results are attained when carbon monoxide of approximately 90 mol. per cent is used.

Other but equivalent combinations may be employed for the starting or reaction mixture, such for example, as carbon monoxide and hydrogen, carbon monoxide and carbon dioxide, carbon monoxide and water, carbon monoxide and dimethyl ether, or mixtures of the same. We have found that the best and more dependable mixture is carbon monoxide, methanol, water, carbon dioxide and dimethyl ether. Where either methanol, water and/or dimethyl ether is employed alone or in mixtures with each other, as a starting material, we find it preferable to vaporize or preheat the same, or the mixture at a temperature of approximately 250° C.

We also find it preferable to preheat the carbon monoxide, carbon dioxide, and/or hydrogen, or mixtures thereof, to a temperature of approximately 250° C. We have discovered that where dimethyl ether, which is one of the condensation or, by-products of the reaction, is mixed with the methanol, or with methanol diluted or mixed with water, and the mixture employed as a starting material, the further formation of the ether is checked. We have also found that the presence of water in the reaction mixture serves to inhibit many of the side reactions, thereby reducing or eliminating the formation of undesirable decomposition products, and hence increasing the yield of acetic acid. The presence of the water constituent in the reaction mixture also acts to prolong the life as well as to preserve the proper degree of hydration of the catalyst, thereby enabling a larger yield of acetic acid and methyl acetate to be obtained.

We have found in practice that by employing carbon dioxide in the reaction mixture, not only is the deposition of free carbon prevented and the rate of decomposition of the carbon monoxide reduced, but, also, that the decomposition of acetic acid after being formed, is cut down, thereby enabling us to increase the yield of acetic acid. The proportion of carbon dioxide employed may vary from 5% to 20% or even higher, as desired.

We have discovered that the production of acetic acid is markedly accelerated if the reaction mixture is pretreated or conditioned before subjecting it to the reaction catalyst. We have found that this important result is attained by passing the reaction mixture over a suitable conditioning agent. Reduced copper affords such an agent. This reconditioning action may take place in the reaction chamber or in a separate chamber, and should be carried out at a temperature of about 250° C.

By pretreating or conditioning the reaction mixture in the manner stated, the rate of the reaction is increased, and, by reason thereof, we have succeeded in increasing the yield of acetic acid by double the amount obtained under otherwise identical conditions of operation. This pretreatment apparently renders the reaction mixture more susceptible to the action of the catalyst, particularly where phosphoric acid is employed as the catalyst.

The relative proportion of pretreating or conditioning agent employed may vary considerably, and is controlled to some extent by the space velocity maintained in the pretreating or conditioning chamber. We have found that the best results are realized when the space velocity in the pretreating or conditioning stage of the operation is 60,000 to 70,000, at a temperature range of 200° C. to 250° C., and a pressure of 2000 to 4000 pounds to the square inch. We have found that the reaction proceeds equally well without the use of a pretreating or conditioning agent but not as rapidly as when such an agent is employed.

The reaction mixture, after passing over the conditioning agent, is then subjected to the action of a suitable catalyst. In practice, we prefer to employ a dehydrating catalyst, and have found the following to be suitable for the purpose, namely, kaolin, calcium silicate, para toluene sulphonic acid, beta naphthol sulphonic acid, aluminum methylate, sublimed ferric chloride, lime (calcium oxide), syrupy phosphoric acid. Of these, and possibly other dehydrating catalysts, we have found that phosphoric acid gives the best results.

While theoretically a conversion of the reaction mixture into acetic acid in carrying out our invention, may be attained without pressure or at atmospheric pressure, nevertheless we have found that it is advantageous to carry out the reaction in the reaction chamber under a pressure ranging from 2,000 to 4,000 pounds per square inch.

We have found in practice that the reaction in the reaction chamber is favored by maintaining the reaction mixture under a proper temperature. Generally speaking, an increase in temperature speeds up the reaction. However, a temperature such as would tend to volatilize or otherwise impair the action of the catalyst, must be avoided.

While a range of reaction temperatures from 300° C. to 495° C. is permissible in carrying out our invention, the best results are attained when the temperature lies between 320° and 350° C. Within this range not only is undue volatilization of the catalyst avoided, but its degree of hydration can be maintained at a desired point. Also, within this range of temperature the life of the catalyst is prolonged while a maximum yield of acetic acid is produced, the rate of reaction is satisfactory and the decomposition of the methanol and carbon monoxide does not become serious.

We have found that the space velocity at which the reaction takes place plays a most important part in the accomplishment of the objects and purposes of our invention. If the space velocity in the reaction chamber is below 5000 not only do the side reactions and decompositions increase greatly, but the production of acetic acid is unsatisfactory both as to quantity and quality. Especially, the loss of methanol, due to its decomposition, becomes serious. With a space velocity ranging between 5000 and 10,000, and even up to 15,000, these difficulties and serious objections are only partially overcome. With a space velocity of from 20,000 to 30,000, we find that we are able to suppress to a satisfactory degree the side reactions and decompositions, increase the amount of methanol recovered, and to increase the yield of acetic acid, the condensates from the reaction products being a clean-cut mixture of acetic acid, methyl acetate, dimethyl ether, water, and methanol.

By "space velocity" we mean the relation of gas or reaction mixture passing over a unit or given catalyst volume at a predetermined speed. Thus, where one cubic foot of reaction mixture passes over one cubic foot of catalyst per minute it is said to have a "space velocity" of 60 feet. It is upon this basis that we have calculated the space velocities hereinabove referred to which give the best results. The speed of reaction and conversion are dependent upon proper space velocity. The factors which control space velocity are temperature, pressure and character of the reaction mixture. By varying these factors the proper space velocities necessary to secure the best results, can be easily adjusted according to the conditions.

In the case of pre-treatment or conditioning of the reaction mixture before subjecting the same to the action of the catalyst for the production of acetic acid, we have found, as hereinbefore noted, that a high rate of space velocity is desirable, say from 60,000 to 70,000 in order to secure the best results, whereas the space velocity in the reaction chamber should be much reduced from these values, that is, to from 20,000 to 30,000.

The catalyst agent employed in the reaction chamber may be used in any desired or convenient form. Where phosphoric acid is used as a catalyst we have found it convenient and desirable to spread it in liquid form over porous carbon, such as coke, hard wood, charcoal, or activated carbon, which is then introduced into the reaction chamber.

The serious and important problem involved in an efficient and economical process of making acetic acid, is to maintain the activity of the catalyst as long as possible. As the catalytic action becomes weaker, side reactions and undesirable decompositions increase, and the yield of acetic acid decreases. Frequent renewals of the catalyst are undesirable since that involves interruption of the continuity of the process and loss of time, heat and pressure.

We have found that a phosphoric acid catalyst can be kept at its maximum efficiency by adding from time to time, additional quantities of fresh phosphoric acid without interrupting the process. This can be easily done by suitable mechanical means without releasing pressures or disturbing temperatures. In this manner the catalyst is maintained practically continuously at maximum efficiency.

We have also found that the life and activity of the catalyst may be maintained by reversing the direction of flow of the reaction mixture thereover from time to time.

The uncondensed vapors and gases are then cooled down to approximately 15° C. to 20° C. The resulting products of this condensation, consisting principally of methanol and methyl acetate with some water and possibly small amounts of other substances, are then trapped out, if desired, and separated from each other for individual use or they may be returned into the circulating system along with any remaining uncondensed gases or otherwise mixed, together or separately, with a fresh supply of raw materials in the reaction system to form a reaction mixture.

The products recovered from the first cooling step may be separated from each other in the usual or any well known manner, and used for any desired purpose for which they are adapted, or the methyl ether and methyl acetate, if desired, may be treated with steam and returned into the circulating system along with the products obtained from the second cooling step, or along with a fresh supply of raw materials.

While we have specified certain temperatures, pressures and relative proportions which we have found to give the best results, it is to be understood that our invention, in its broadest scope, is not to be limited or restricted to the use of the specific degrees of temperature, pressure or relative proportions given as our invention contemplates the employment of permissible ranges thereof within reasonable limits.

From the foregoing description it will be seen that we provide a simple, efficient and economical process for the manufacture of acetic acid, and in our actual operation of the process we have demonstrated its practicability, the ease and economy of carrying it out, and the commercial value of the result attained by it in the production of a larger volume of acetic acid of improved quality, than has heretofore been found possible. It will also be seen that the process is one that lends itself admirably to a flexibility of location which is greatly advantageous for economic operation.

Having now set forth the objects and nature of our invention, and the manner in which the same is carried out in securing the greatest advantage and benefit, what we claim as new and useful and of our own invention, and desire to secure by Letters Patent is,—

1. The process which consists in subjecting a mixture containing methanol and carbon monoxide to the action of reduced copper to condition the same, and then subjecting the conditioned mixture to the action of an acetic acid synthesis catalyst.

2. The process which consists in subjecting a mixture containing methanol and carbon monoxide to the action of reduced copper to condition the same and then subjecting the conditioned mixture to the catalytic action of phosphoric acid.

3. The process which consists in mixing together methanol and water, then supplying carbon monoxide to form therewith a reaction mixture, then subjecting the reaction mixture to the action of reduced copper to condition the same, and finally subjecting the conditioned mixture to the action of an acetic acid synthesis catalyst.

4. The process which consists in heating a reaction mixture containing methanol and carbon monoxide and subjecting the mixture while in heated condition to the action of reduced copper in a heated state, and finally subjecting the heated and conditioned mixture to the action of a heated catalyst.

5. The process which consists in heating a reaction mixture containing methanol, water and carbon monoxide and subjecting the heated mixture to the action of reduced copper maintained in heated condition, to condition the same, and then subjecting the conditioned mixture to the action of a heated catalyst.

6. The process which consists in heating a reaction mixture containing methanol, water and carbon monoxide and subjecting the heated mixture to the action of reduced copper maintained in heated condition, to condition the same and then subjecting the conditioned mixture to the action of heated phosphoric acid.

7. The process which consists in mixing together vaporized methanol and water under heat and pressure and supplying to the mixture carbon monoxide under heat and pressure, to form a reaction mixture conditioning the reaction mixture with heated reduced copper and finally subjecting the conditioned mixture to the action of an acetic acid synthesis catalyst under heat and pressure.

8. The process which consists in subjecting a mixture containing methanol and carbon monoxide under pressure and heat and at a high space velocity to the action of reduced copper to condition the mixture, and then subjecting the conditioned mixture to the action of an acetic acid synthesis catalyst under pressure and at a higher heat but a lower space velocity.

9. The process which consists in subjecting a mixture containing methanol and carbon monoxide under pressure and heat and at a high space velocity to the action of reduced copper to condition the mixture, and then subjecting the conditioned mixture to the action of phosphoric acid under pressure and at a higher heat but a lower space velocity.

10. The process which consists in vaporizing a mixture containing methanol and water at a temperature of from 200° C. to 250° C. and adding carbon monoxide at a temperature of from 200° C. to 250° C. to said vaporized mixture to form a reaction mixture, then passing the reaction mixture over reduced copper at a temperature of from 200° C. to 250° C., to condition the same and then passing the conditioned mixture over an acetic acid synthesis catalyst at a temperature of from 300° C. to 495° C.

11. The process which consists in vaporizing a reaction mixture containing methanol, water and carbon monoxide at a temperature of from 200° C. to 250° C. and passing the same over reduced copper maintained at the same range of temperature, to condition the same, and then passing the conditioned mixture over an acetic acid synthesis catalyst maintained at a temperature of from 300° C. to 495° C.

12. The process which consists in passing a reaction mixture containing methanol and carbon monoxide over reduced copper at a space velocity of from 60,000 to 70,000, to condition the same and then passing the conditioned mixture over a catalyst at an acetic acid synthesis reduced space velocity.

13. The process which consists in passing a reaction mixture containing methanol and carbon monoxide over reduced copper at a space velocity of from 60,000 to 70,000, to condition the same and then passing the conditioned mixture over a catalyst at an acetic acid synthesis space velocity of from 20,000 to 30,000.

14. The process which consists in passing a reaction mixture containing methanol and carbon monoxide over reduced copper at a space velocity of from 60,000 to 70,000, to condition the same, and then passing the conditioned mixture over an acetic acid synthesis catalyst at a reduced space velocity.

15. The process which consists in passing a reaction mixture containing methanol and carbon monoxide over reduced copper at a space velocity of from 60,000 to 70,000, to condition the same, and then passing the conditioned mixture over phosphoric acid as a catalyst at a reduced space velocity.

16. The process which consists in passing a reaction mixture containing methanol and carbon monoxide over reduced copper at a space velocity of from 60,000 to 70,000, to condition the same, and then passing the conditioned mixture over an acetic acid synthesis catalyst at a space velocity of from 20,000 to 30,000.

17. The process which consists in subjecting a mixture containing methanol and carbon monoxide to the action of reduced copper, then subjecting the same to the action of an acetic acid synthesis catalyst and maintaining the life and activity of the catalyst by reversing from time to time the direction of the flow of the reaction mixture past the catalyst.

18. The process which consists in subjecting a mixture containing methanol and carbon monoxide to the action of reduced copper, then subjecting the same to the catalytic action of phosphoric acid and prolonging the life and activity of the catalytic action of the phosphoric acid by reversing from time to time the direction of flow of the reaction mixture over the said acid.

19. The process which consists in subjecting a reaction mixture containing methanol, water, carbon monoxide and carbon dioxide, under heat and pressure and at a high space velocity, to the action of reduced copper to condition the same, then passing the conditioned mixture under heat and pressure at a lower space velocity, over an acetic acid synthesizing catalytic agent, and prolonging the life and activity of the catalyst by reversing from time to time the direction of flow of the reaction mixture thereover.

20. The process of manufacturing acetic acid which consists in subjecting a reaction mixture containing methanol and carbon monoxide to the action of reduced copper to condition the same, then subjecting the conditioned mixture to the action of an acetic acid synthesis catalyst and then condensing the resulting vapors and gases at a successively reduced temperature to recover therefrom the acetic acid and by-products of the reaction.

21. The process of manufacturing acetic acid which consists in subjecting a reaction mixture containing methanol and carbon monoxide to the action of reduced copper to condition the same, then subjecting the conditioned mixture to the action of an acetic acid synthesis catalyst, then condensing the resulting vapors and gases at a successively reduced temperature to recover therefrom the acetic acid and by-products of the reaction and then returning the uncondensed gases and vapors, and any one or more of the recovered by-products into the circulating system.

22. The process which consists in vaporizing a reaction mixture containing methanol, water, carbon monoxide, dimethyl ether and carbon dioxide at a temperature not exceeding 250° C., then passing the mixture over reduced copper at a high space velocity, to condition the same, then passing the conditioned mixture over an acetic acid synthesis catalyst at a temperature not exceeding 495° C., but at a reduced space velocity.

23. The process which consists in vaporizing a reaction mixture containing methanol, water, carbon monoxide, diemthyl ether and carbon dioxide at a temperature not exceeding 250° C., then passing the mixture over reduced copper at a high space velocity, to condition the same, then passing the conditioned mixture over an acetic acid synthesis catalyst at a temperature not exceeding 495° C., but at a reduced space velocity and prolonging the life and activity of the catalyst by reversing from time to time the direction of flow of the reaction mixture over the catalyst.

24. The process which consists in vaporizing a reaction mixture containing methanol, water, carbon monoxide, dimethyl ether and carbon dioxide at a temperature not exceeding 250° C., then passing the mixture over reduced copper at a high space velocity, to condition the same, then passing the conditioned mixture over an acetic acid synthesis catalyst at a temperature not exceeding 495° C., but at a reduced space velocity and condensing the resulting vapors and gases to recover therefrom the free acetic acid and by-products of the reaction.

25. The process which consists in vaporizing a reaction mixture containing methanol, water, carbon monoxide, dimethyl ether and carbon dioxide at a temperature not exceeding 250° C., then passing the mixture over reduced copper at a high space velocity, to condition the same, then passing the conditioned mixture over an acetic acid synthesis catalyst at a temperature not exceeding 495° C., but at a reduced space velocity and condensing at successively reduced temperatures the resulting vapors and gases to recover therefrom the free acetic acid and by-products of the reaction.

26. The process which consists in vaporizing a reaction mixture containing methanol, water, carbon monoxide, dimethyl ether and carbon dioxide at a temperature not exceeding 250° C., then passing the mixture over reduced copper at a high space velocity, to condition the same, then passing the conditioned mixture over an acetic acid synthesis catalyst at a temperature not exceeding 495° C., but at a reduced space velocity, condensing the resulting vapors and gases to recover therefrom the free acetic acid and by-products of the reaction and returning into the circulating system the recovered by-products and uncondensed vapors and gases.

27. The process which consists in vaporizing and mixing together methanol and water, under heat and pressure, then pre-heating carbon monoxide and adding the same thereto to form a reaction mixture, then passing the reaction mixture over reduced copper at a temperature of from 200° C. to 250° C., at a space velocity of from 60,000 to 70,000 and under pressure, to condition the same, then passing the conditioned reaction mixture over an acetic acid synthesis catalyst at a temperature of from 320° C. to 350° C., a space velocity of from 20,000 to 30,000, and a pressure of from 2,000 to 4,000 pounds and finally condensing the resulting gases and vapors to recover free acetic acid and by-product condensates.

28. The process which consists in vaporizing and mixing together methanol and water, under heat and pressure, then pre-heating carbon monoxide and adding the same thereto to form a reaction mixture, then passing the reaction mixture over reduced copper at a temperature of from 200° C. to 250° C., at a space velocity of from 60,000 to 70,000 and under pressure, to condition the same, then passing the conditioned reaction mixture over phosphoric acid as a catalyst at a temperature of from 320° C. to 350° C., a space velocity of from 20,000 to 30,000, and a pressure of from 2,000 to 4,000 pounds and finally condensing the resulting gases and vapors to recover free acetic acid and by-product condensates.

29. The process which consists in vaporizing and mixing together methanol and water, under heat and pressure, then pre-heating carbon monoxide and adding the same thereto to form a reaction mixture, then passing the reaction mixture over reduced copper at a temperature of from 200° C. to 250° C., at a space velocity of from 60,000 to 70,000, and under pressure, to condition the same, then passing the conditioned reaction mixture over an acetic acid synthesis catalyst at a temperature of from 320° C. to 350° C., a space velocity of from 20,000 to 30,000, a pressure of from 2,000 to 4,000 pounds and prolonging the life and activity of the catalyst by reversing, from time to time the direction of flow of the reaction mixture thereover.

30. The process which consists in subjecting a mixture containing methanol and carbon monoxide under heat and pressure and at a high space velocity to the action of reduced copper to condition the same, then subjecting the conditioned mixture under heat and pressure, at a reduced space velocity to the action of an acetic acid synthesis catalyst and varying the said space velocities by varying the heats and pressures.

31. The process which consists in subjecting a mixture containing methanol and carbon monoxide under pressure and heat and at a high space velocity to the action of reduced copper to condition the mixture, then subjecting the conditioned mixture to the action of an acetic acid synthesis catalyst under pressure at a higher heat but a lower space velocity and varying the said space velocities by varying the heats and pressures.

32. The process which consists in subjecting a mixture containing methanol and carbon monoxide under pressure and heat and at a high space velocity to the action of reduced copper to condition the mixture, then subjecting the conditioned mixture to the action of phosphoric acid under pressure at a higher heat but a lower space velocity and varying the said space velocities by varying the heat and pressures.

JOSEPH C. CARLIN.
NORMAN W. KRASE.